United States Patent [19]
Kobayashi

[11] Patent Number: 5,373,363
[45] Date of Patent: Dec. 13, 1994

[54] APPARATUS FOR MEASURING LENGTH OF ARTICLE TRANSPORTED ON CONVEYOR

[75] Inventor: Masaaki Kobayashi, Tokyo, Japan

[73] Assignee: Shinko Denshi Company Limited, Tokyo, Japan

[21] Appl. No.: 63,973

[22] Filed: May 20, 1993

[30] Foreign Application Priority Data

May 20, 1992 [JP] Japan .................. 4-152780

[51] Int. Cl.$^5$ ............................ G01B 11/04
[52] U.S. Cl. .................. 356/383; 250/560
[58] Field of Search ............... 356/372, 379, 380, 383; 280/560

[56] References Cited

U.S. PATENT DOCUMENTS

| | | | |
|---|---|---|---|
| 2,916,633 | 12/1959 | Stone et al. ............... | 250/560 |
| 3,428,817 | 2/1969 | Hofmeister et al. ........ | 250/560 |
| 3,682,554 | 8/1972 | Flaczynski ................ | 250/560 |
| 4,088,411 | 5/1978 | Ahlquist et al. .......... | 356/383 |

FOREIGN PATENT DOCUMENTS

| | | | |
|---|---|---|---|
| 0003566 | 1/1979 | Japan .................. | 356/383 |
| 0113806 | 7/1983 | Japan .................. | 356/383 |
| 0029707 | 2/1986 | Japan .................. | 356/383 |
| 0275304 | 11/1990 | Japan ................. | 250/560 |

*Primary Examiner*—F. L. Evans
*Attorney, Agent, or Firm*—Varndell Legal Group

[57] ABSTRACT

An apparatus for measuring a length of an article which is transported by a conveyor including first and second light sensors arranged along the conveyor being separated from each other by a reference distance which is similar to a minimum length or an average length of the articles, a rotary encoder secured to a roller of the conveyor ant at least one counter for counting output pulses from the rotary encoder, the counting operation of the counter being controlled by output signals from the first and second light sensors. A length of the article is calculated as a sum of the reference length and a length derived from at least one count value of the counter. The reference length can be predetermined precisely, so that the length of the article can be measured very accurately.

9 Claims, 6 Drawing Sheets

APPARATUS FOR MEASURING LENGTH OF ARTICLE TRANSPORTED ON CONVEYOR

BACKGROUND OF THE INVENTION

1. Field of the Invention

The present invention relates to an apparatus for measuring a length of an article which is transported on a conveyor, and more particularly to an apparatus for measuring a length of a rectangular article in a traveling direction on the conveyor in a simple and accurate manner.

2. Description of the Related Art

It is sometimes required to measure a size of a rectangular article traveled on a conveyor. Height and width of the article can be simply measured by, for instance an optical measuring method, even when the article is moved. A length of the article viewed in a direction in which the article is fed on the conveyor is seemed to be measured easily, but in practice it is rather difficult to measure the length of the article accurately.

FIG. 1 is a perspective view showing an example of a known apparatus for measuring the length of the rectangular article traveled on the conveyor. A rectangular article 1 is fed on a conveyor 2 comprising a plurality of rollers 3 in a direction denoted by an arrow at a constant velocity V. When the rollers 3 are rotated at a constant speed, it may be assumed that the article 1 is fed on the conveyor 2 also at the constant velocity. Therefore, in the known apparatus, there is arranged a single set of an light sensor including a light source 4A for projecting a light beam 4C in a direction which is perpendicular to the feeding direction of the conveyor 2 and a photodetector 4B for receiving the light beam 4C. That is to say, the light source 4A and photodetector 4B are arranged on respective side of the article traveling path on the conveyor 2. It should be noted that the light beam 4C situates above the conveyor 2 at such a level that the light beam is made incident upon a side wall of the article 1. Then, by detecting a time interval from an instant at which the light beam 4C is interrupted by a front end of the article 1 to an instant at which a rear end of the article has just passed through the light beam 4C, it is possible to measure the length L of the article 1 as a product of the time interval t and the traveling speed V of the article, i.e. L=V*t.

FIG. 2 is a perspective view illustrating another known apparatus for measuring a length of an article on a conveyor. This known apparatus has a similar construction as that of the known apparatus shown in FIG. 1, and comprises a rotary encoder 5 provided on a roller 3 constituting the conveyor 2 on which the article 1 is fed in the direction V. The rotary encoder 5 detects a rotation angle of the roller 3, so that the traveling distance of the article 1 on the conveyor 2 may be derived by counting output pulses generated by the rotary encoder 5. Therefore, the length L of the article 1 can be measured by counting the output pulses from the rotary encoder 5 during the time period t during which the light beam 4C is interrupted by the article.

In the above mentioned known apparatuses, the measurement could not be performed accurately due to following various factors, so that the reliability of the measuring is low.

(a) variation in the rotation speed of the conveyor rollers
(b) variation in diameters of the rollers due to wear of roller surfaces and adhesion of impurities
(c) slip between the article and the rollers
(d) non-flatness of the bottom surface of article In the known apparatus shown in FIG. 1, all the above mentioned factors have an influence on the traveling velocity V of the article on the conveyor. Then, the length L of the article 1 could not be represented by the above mentioned equation L=V*t, and thus the length of the article could non be measured accurately in case of variable velocity V.

In the known apparatus illustrated in FIG. 2, when the rotary encoder 5 is provided on the roller 3 of the conveyor 2 which situates just below the light beam 4C, to measure the length is equivalent to measure the length of the bottom surface of the article 1 by utilizing the rotation angle of the roller 3, so that variation in the traveling speed V of the article 1 could no more affect the measurement and an error in the measurement can be reduced. However, the remaining factors (b) to (d) still affect the measurement, and therefore the length of the article could not be measured accurately.

SUMMARY OF THE INVENTION

The present invention has for its object to provide a novel and useful apparatus for measuring a length of an article transported on a conveyor, in which the above mentioned drawbacks of the known apparatuses can be effectively removed and the length of the article can be measured simply and accurately.

According to the invention, an apparatus for measuring a length of an article transported by a conveyor including a plurality of rollers in a given direction, comprises:

an article detecting means including plural sets of light sensors arranged along the conveyor such that a distance between successive light sensors is set to a predetermined reference distance to generate article detection signals;

a rotation angle detecting means for detecting a rotation angle of a roller of the conveyor to generate a rotation signal; and a length measuring means for measuring a length of an article by processing the article detection signals and rotation signal.

In the apparatus according to the invention, the length of the article viewed in a direction in which the article is transported by the conveyor can be measured in an easy and accurate manner, while a substantial part of the length is detected by the article detection signal supplied from the light sensors and a remaining length of the article is derived from the rotation signal, so that the length of the article can be measured accurately.

DESCRIPTION OF THE PREFERRED EMBODIMENTS

Figure 3:
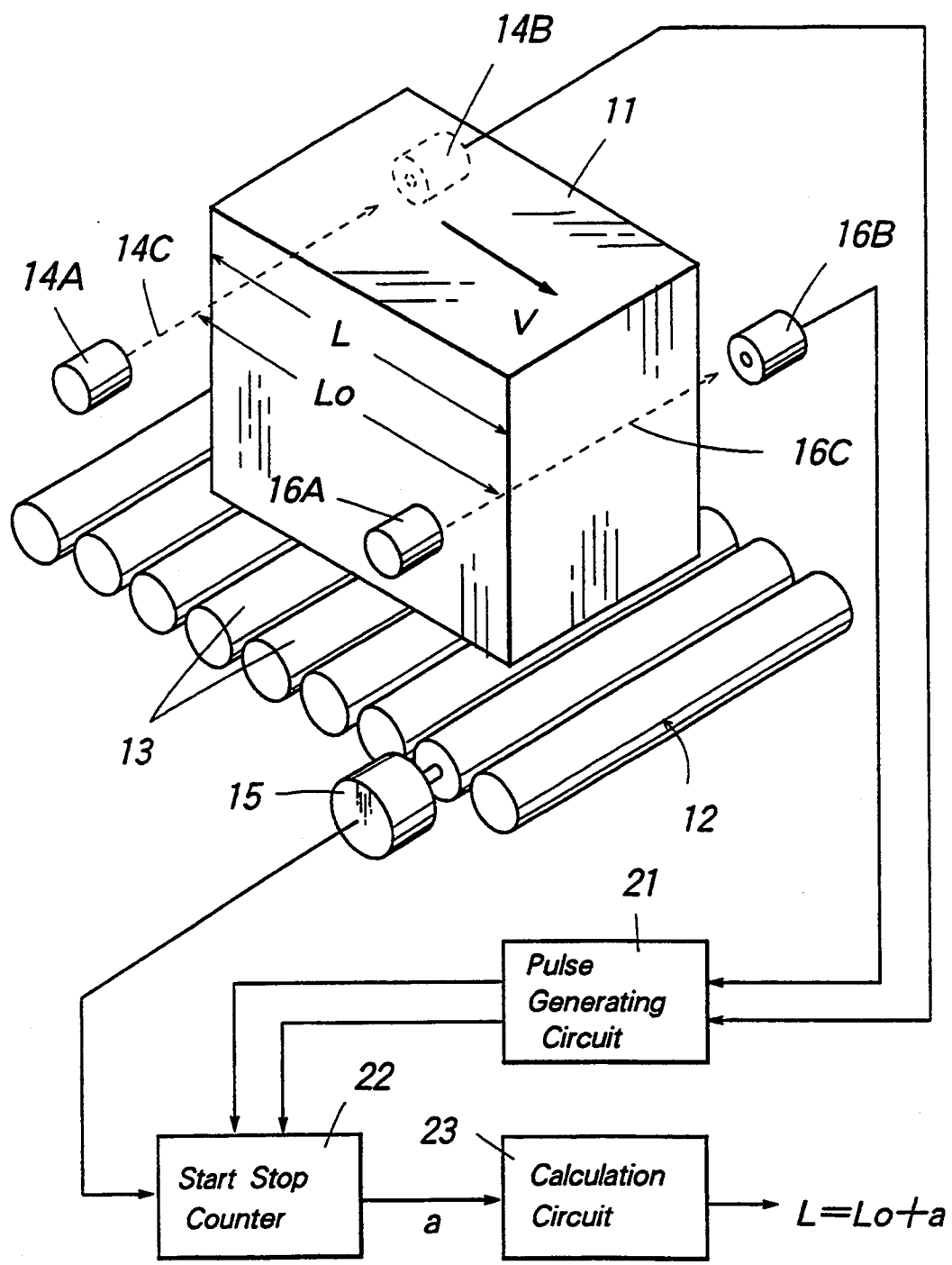
FIG. 3 is a perspective view depicting an embodiment of the length measuring apparatus according to the invention.

FIG. 3 is a perspective view depicting an embodiment of the apparatus for measuring a length of an article transported by a conveyor. In the present embodiment, there are provided first and second sets light sensors including light sources 14A, 16A and photodetectors 14B, 16B and a distance between light beams 14C and 16C of these first and second sets of light sensors 14A, 14B and 16A, 16B is set to a reference length L0.

According to the invention, the reference length L0 is set to be substantially equal of the length of the article . In the present embodiment, the reference length L0 is determined to be equal to or slightly shorter than a predictable shortest length of articles. That is to say, lengths of all articles are equal to or longer than the reference length L0.

Now it is first assumed that an article 11 having a length just equal to the reference length L0 is traveled on a conveyor 12. At first a front edge of the article passes through a light beam 14C of first set of light sensor 14A, 14B and interrupts the light beam. When the rear edge of the article 11 has just passed through the light beam 14C, the photodetector 14B begins to receive again the light beam 14C and at the same time the front edge of the article 11 interrupts the light beam 16C of the second set of light sensor 16A, 16B.

Next it is assumed that an article 11 having a length L which is slightly longer than the reference length L0 (L=L0+a) is fed on the conveyor 12. At first the light beam 14C received by the photodetector 14B is interrupted by a front edge of the article 11 and next the light beam 16C received by the photodetector 16B is interrupted by the front edge of the article 11. After a time during which the article 11 is moved by an another length a, the photodetector 14B begins to receive the light beam 14C again.

In the present embodiment, as shown in FIG. 3, outputs of the photodetectors 14B and 16B are connected to a pulse generating circuit 21 which produces a count start pulse in response to a falling edge of the output signal of the photodetector 16B and a count stop signal in response to a raising edge of the output signal of the photodetector 14B. The output pulses of the rotary encoder 15 are supplied to a counter 22 and are counted thereby. To the counter 22 the count start and stop signals are also supplied from the pulse generating circuit 21. Therefore, the counter 22 counts the output pulses of the rotary encoder 15 during a time period from an instant at which the front edge of the article 11 passes through the light beam 16C to an instant at which the rear edge of the article interrupts the light beam 14C. Then, a count value obtained by the counter 22 is supplied to a calculation circuit 23 to derive a sum of the reference length L0 and a length of the portion a corresponding to the count value as a measured length L of the article 11.

Figure 1:
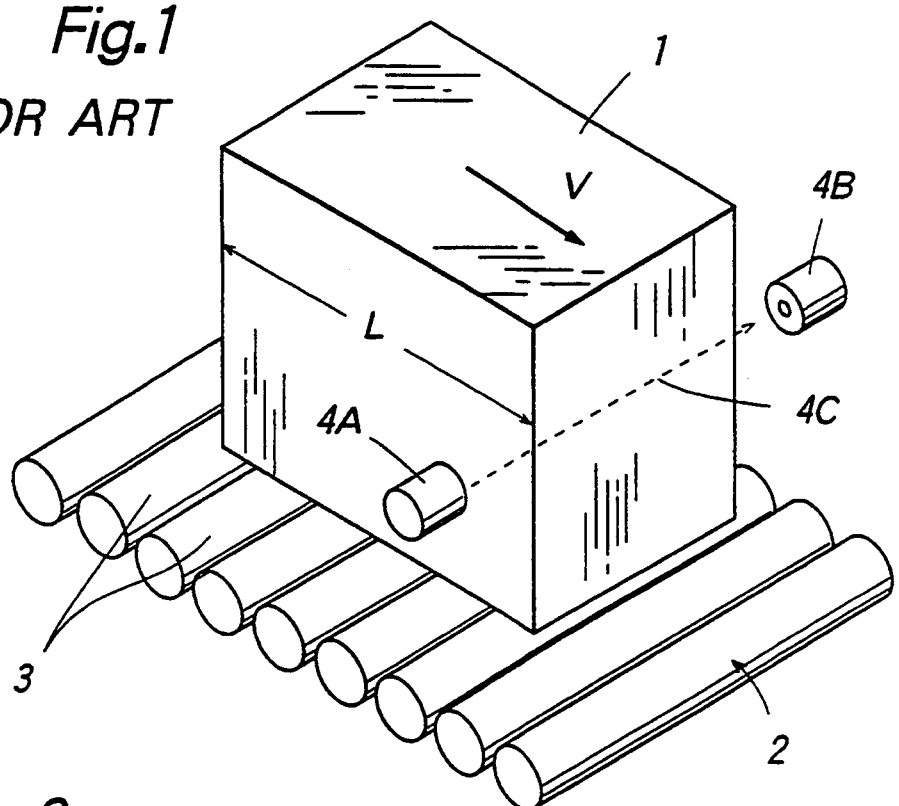
FIG. 1 is a perspective view showing a known apparatus for measuring a length of an article fed on a conveyor.
Figure 2:
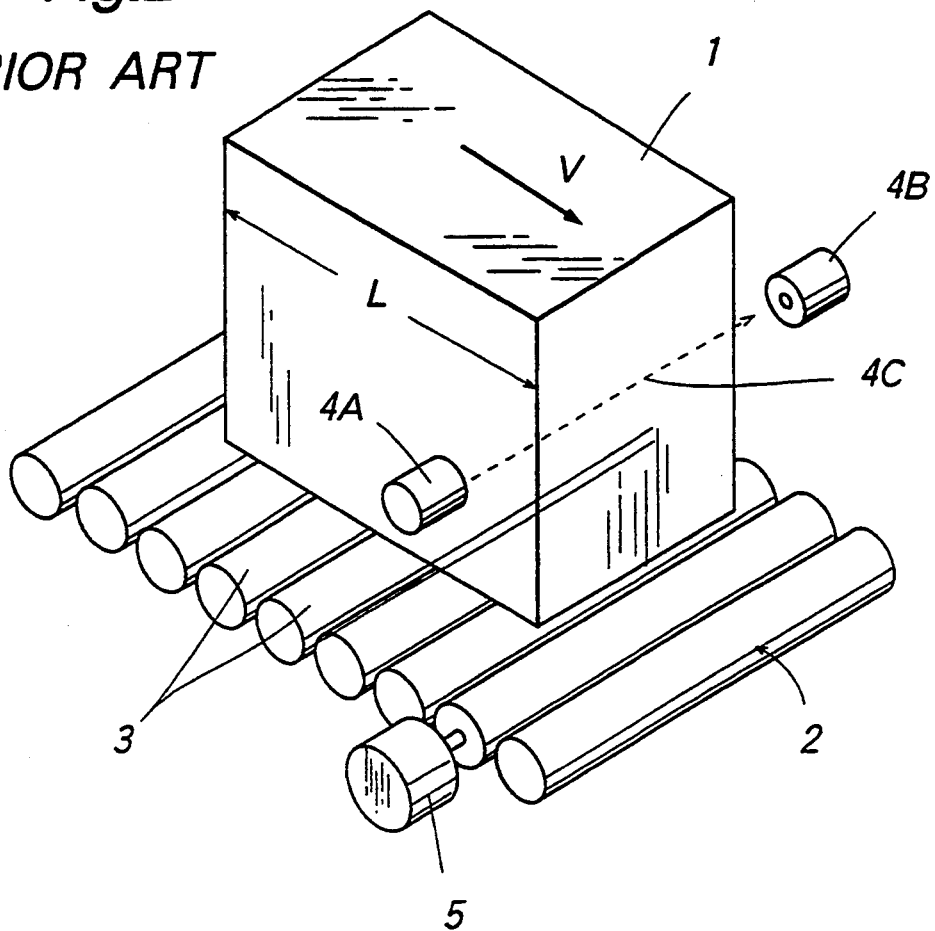
FIG. 2 is a perspective view illustrating another known apparatus for measuring a length of an article.

In this case, the reference length L0 does not contain an error, so that an error introduced into the measured whole length L is reduced in comparison with error of the known apparatus by a/(L0+a). According to the invention, a substantial part of the length of the article 11 is measured in accordance with the reference length L0, so that the measured length contains only a very small error. In the known apparatus shown in FIG. 1, the length of the article is measured from the traveling speed and time of the article on the conveyor, so that when the traveling speed is varied, the length could not be measured accurately. Contrary to this, in the apparatus according to the invention, greater part of the article is measured in accordance with the reference length which can be predetermined precisely, so that the length of the article can be measured very accurately.

In the above embodiment, the reference length L0 is set to be equal to or slightly shorter than the minimum length of the articles, so that it is possible to measure the length of the article which is equal to or longer than the reference length L0. According to the invention, the reference length L0 may be set to be longer than the minimum length of the articles. For instance, the reference length L0 may be set to an average length or a standard length of the articles. In this case, lengths of some articles become shorter than the reference length L0. According to the invention, it is also possible to measure the length of the article which is shorter than the reference length L0.

Figure 4:
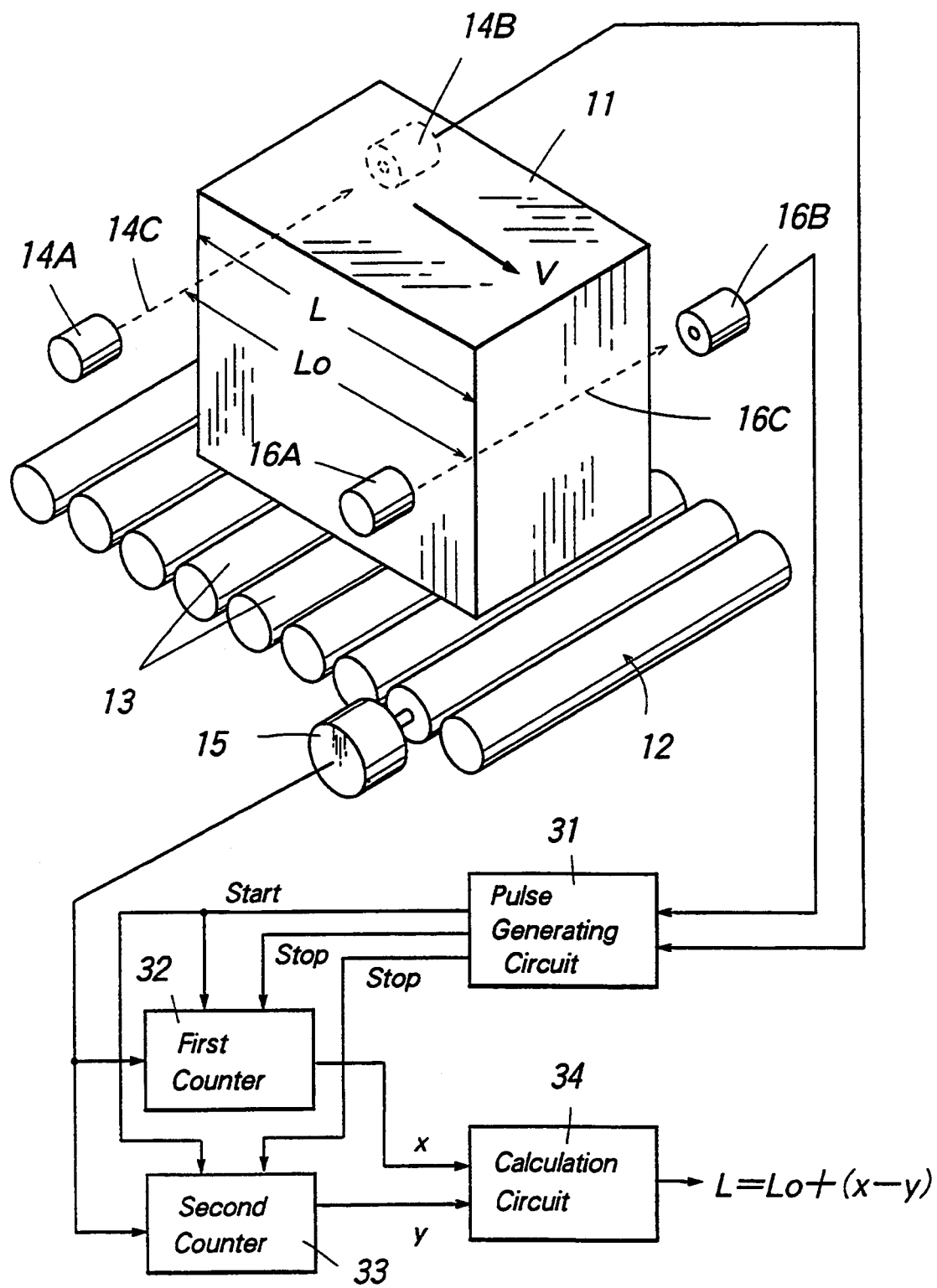
FIG. 4 is a perspective view showing another embodiment of the length measuring apparatus according to the invention.

Now an embodiment of the apparatus which can measure the length of the article shorter than the reference length L0 will be explained with reference to FIGS. 4 and 5a and 5b. In FIG. 4, portions similar to those shown in FIG. 3 are denoted by the same reference numerals used in FIG. 3. The output signals of the photodetectors 14B and 16B of the first and second sets of light sensors 14A, 14B and 16A, 16B are supplied to a pulse generating circuit 31 which generates a count start signal when a front edge of an article 11 interrupts the light beam 14C of the first set of light sensor 14A, 14B, a first count stop signal when a rear edge of the article passes through the light beam 14C and a second count stop signal when the front edge of the article interrupts the light beam 16C of the second set of light sensor 16A, 16B. There are provided first and second counters 32 and 33 which count the output pulses generated by the rotary encoder 15 secured to the roller 13 of the conveyor 12. The count start signal generated by the pulse generator 31 is supplied to the first and second counters 32 and 33, so that these counters begin to count the output pulses from the rotary encoder 15 when the front edge of the article 11 just interrupts the light beam 14C. The first count stop signal is supplied to the first counter 32 and the second count stop signal is supplied to the second counter 33. Therefore, the first counter 32 counts the output pulses generated by the rotary encoder 15 during a time period from an instant at which the front edge of the article 11 is detected by the first set of the light sensor 14A, 14B to an instant at which the rear edge of the article is detected by the first set of light sensor 14A, 14B. Similarly the second counter 33 counts the output pulses from the rotary encoder 15 during a time period from an instant at which the front edge of the article 11 is detected by the first set of light sensor 14A, 14B to an instant at which the front edge of the article is detected by the second set of light sensor 16A, 16B.

Figure 5A:
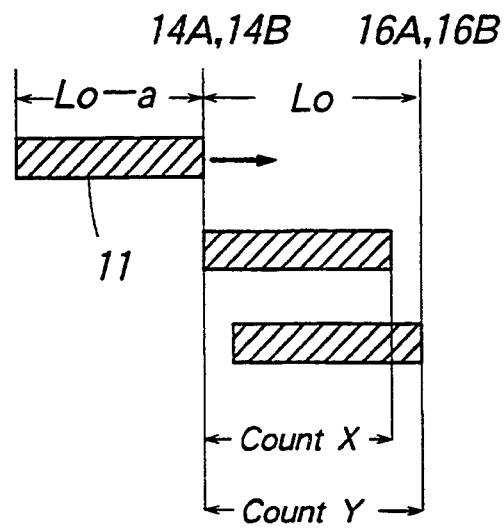
FIGS. 5a and 5b are schematic views for explaining the operation of the length measuring apparatus shown in FIG. 4.
Figure 5B:
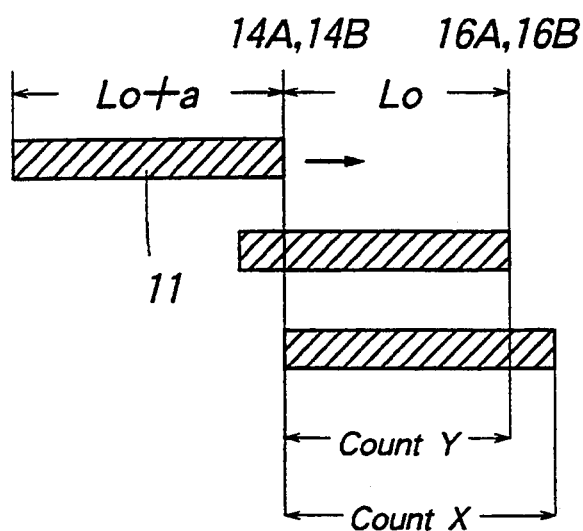

FIG. 5a illustrates a case in which the article 11 has a length shorter than the reference length L0, and FIG. 5b shows a case in which the article 11 has a length longer than the reference length L0. In the present embodiment, in both the cases the length of the article can be measured by the entirely same sequence. In the case of FIG. 5a, a count value x of the first counter 32 represents a length of the article 11 and a count value y of the second counter 33 corresponds to the reference length L0. These count values x and y are supplied to a calculation circuit 34 and the length L of the article 11 can be measured by effecting the calculation of $L=L0+(x-y)$. In the case of FIG. 5b, the length L of the article 11 can be also obtained by $L=L0+(x-y)$.

In the present embodiment, the second counter 33 detects the reference length L0 by counting the output pulses from the rotary encoder 15 and thus could be dispensed with. However, the precision of the measurement can be improved by means of the second counter 33. This will be explained by way of a numerical example. Now it is assumed that the reference length L0 is 250 mm, the length L of the article 11 is $L0+a=300$ mm, and a unit count of the counters 32 and 33 corresponds to 1 mm. Then, the length L of the article 11 may be measured by the count value x of the first counter 32 as can be understood from FIG. 5b. However, in practice the count values x and y of the counters 32 and 33 contain an error. For instance, it is assumed that the rotary encoder 15 has a span error of 2%. Then, the length measured by the count value x also contains an error of 2% and becomes 306 mm. The error of 6 mm is not permissible in practice.

In the present embodiment, the length L is derived by the above mentioned equation $L=L0+(X-y)$, in which both the count values x and y include the error of 2%. Therefore, the count value becomes 255 mm and thus a difference which corresponds to the length of a portion a of the article becomes $306-255=51$ mm. Therefore, the length L becomes $250+51=301$ mm. That is to say, the measured length (301 mm) differs from the actual length (300 mm) only by 1 mm. That it to say, the error contained in the measured length is reduced from the error of known apparatus by six times.

Figure 6:
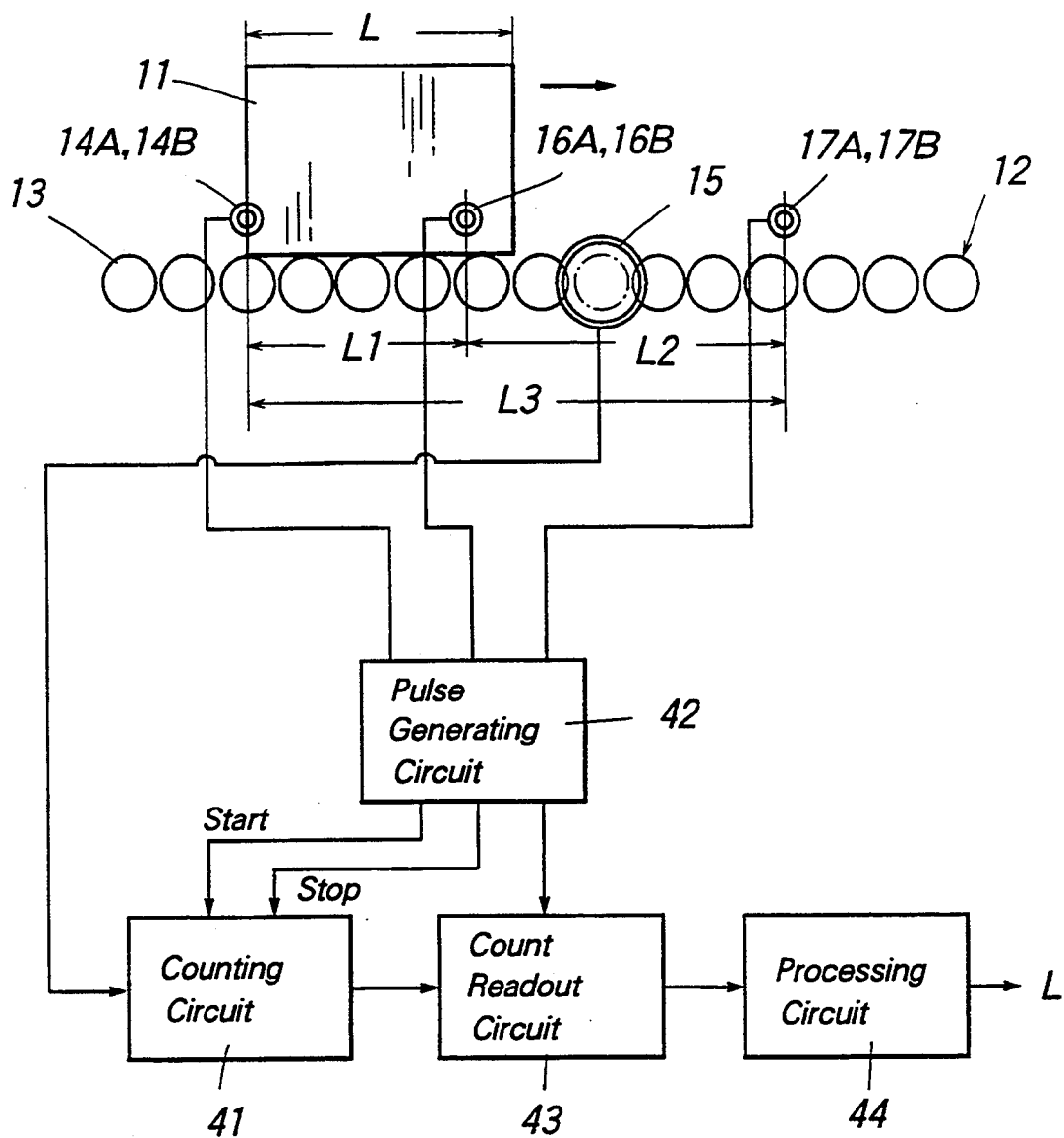
FIG. 6 is a side view showing another embodiment of the length measuring apparatus according to the invention.

FIG. 6 shows another embodiment of the length measuring apparatus according to the invention. In the present embodiment, there are arranged three sets of light sensors 14A, 14B; 16A, 16B and 17A, 17B such that three reference lengths L1, L2 and L3 are set. The second reference length L1 and the third reference length L3 is set to a sum of the first and second reference lengths L1 and L2. The output pulses generated by the rotary encoder 15 are supplied to a counting circuit 41 and are counted thereby. The output signals generated by the three photodetectors 14B, 16B and 17B are supplied to a pulse generating circuit 42 which produces count start signal, count stop signal and count readout command. In the present embodiment, the pulse generating circuits 42 operates as follows. When a front edge of the article 11 is detected by the first light sensor 14A, 14B, the pulse generating circuit 42 produces a count start signal in response of which the counting circuit 41 initiates to count the output pulses from the rotary encoder 15. When a rear edge of the article it is detected by the third light sensor 17A, 17B, the pulse generating circuits 42 produces a count stop signal in response to which the counting operation of the counting circuits 41 is stopped. The pulse generating circuit 42 further generates count readout commands when the front edge of the article 11 is detected by the second and third light sensors 16A, 16B and 17A, 17B as well as when the rear edge of the article is detected by the first, second and third light sensors 14A, 14B; 16A, 16B and 17A, 17B. These count readout commands are supplied to a count readout circuit 43. The count readout circuit 43 reads out count values of the counting circuit 41 at time instants when the count readout commands are generated and thus readout count values are supplied to a calculation circuit 44.

In the present embodiment, the calculation circuit 44 calculates three measured lengths in the same manner as explained above with reference to the second embodiment shown in FIG. 4 by using the three reference lengths L1, L2 and L3 and readout count values. Then, a measured length which is closest to one of the reference lengths is selected as a final measured length L of the article. That is to say, according to the invention, when there are provided two or more than two sets of light sensors, at a time when a substantial part of the length of the article is judged, a distance between the front or rear edge of the article and a light beam which situated nearest to the front or rear edge is measured by counting the output pulses of the rotary encoder 15, and then the length of the article is derived as a sum of the reference length and a length corresponding to the count value. For instance, when the three measured lengths are close to the second reference length L2, a measured value calculated by using the second reference length is selected as the final measure length L. When the three measured lengths are near the longest reference length L3, a measured length obtained by using the reference length L3 is selected as the final measured length L. In this manner, it is possible to obtain the final measured length L which contains a minimum error.

In the above embodiment, the calculation circuit may include three counters or three sets of the first and second counters 32 and 33 illustrated in FIG. 4. It should be noted that the calculation circuit 44 may calculate an average of the three measured lengths. Further, it is possible to arrange the three light sensors such that the first and second reference lengths L1 and L2 are equal to each other. In such a case, the calculation circuit is preferably constructed to derive an average of the two measured lengths which are obtained by using the first and second reference lengths L1 and L2.

In the length measuring apparatus according to the present invention, the above mentioned span error of the rotary encoder due to secular variation can be reduced by a different method. That is to say, after the reference length has been measured by counting the output pulses from the rotary encoder 15, this length is compared with the predetermined reference length L0 and a correction coefficient is derived. Then, a measured length of the portion a of the article is also corrected in accordance with the correction coefficient. In this manner, the length of the portion of the article can be measured accurately, and thus the whole length L of the article as a sum of the reference length L0 and the length of the portion a is measured accurately.

Figure 7:
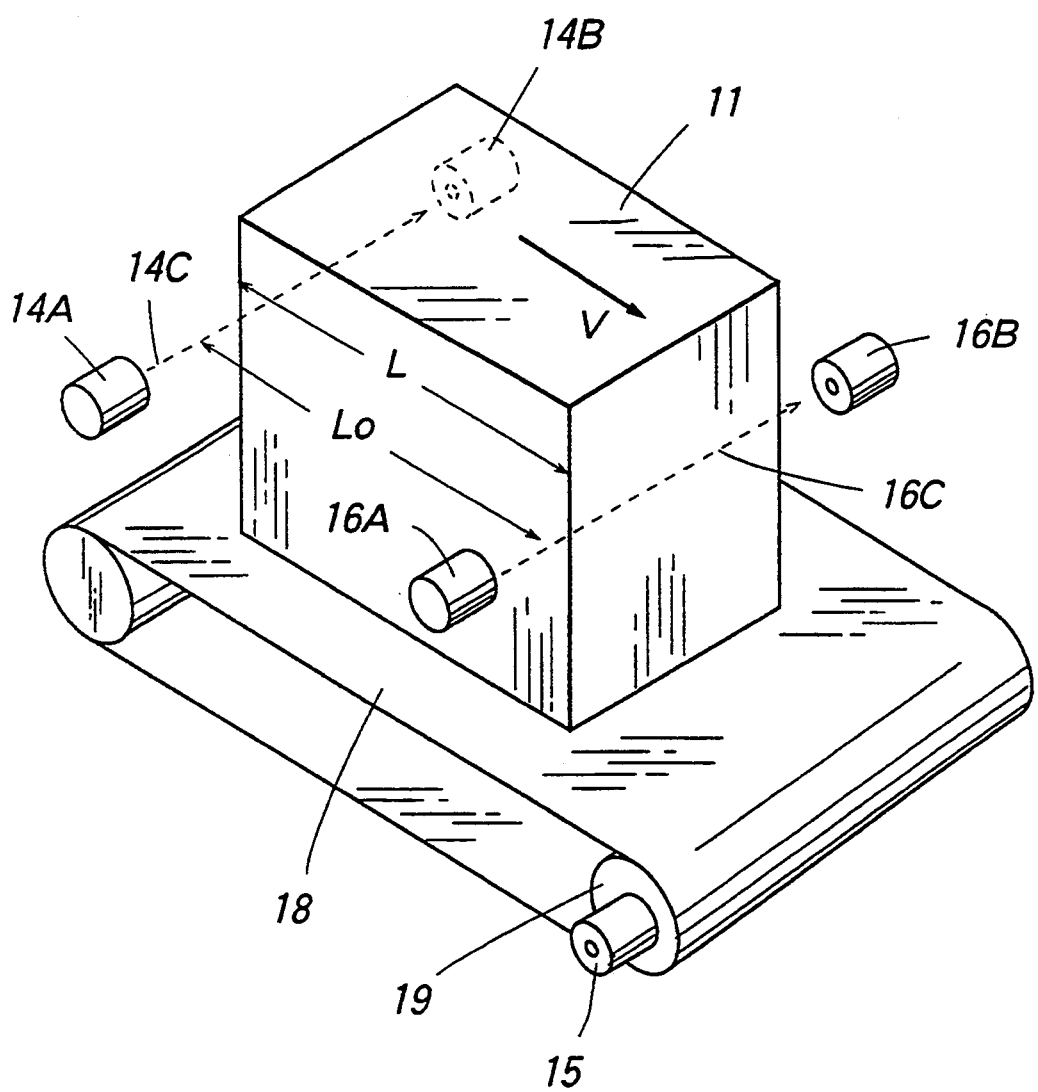
FIG. 7 is a perspective view illustrating still another embodiment of the length measuring apparatus according to the invention.

In the embodiments so far explained, the conveyor is formed by a series of the rollers, but according to the invention, the conveyor may be formed by a belt 18 as shown in FIG. 7. In this embodiment, the rotary encoder 15 is provided on a driving roller 19. The remaining construction of the present embodiment is entirely same as that of the previous embodiments.

As explained above, in the length measuring apparatus according to the invention, plural sets of light sensors are arranged with disposing at least one reference length therebetween and a substantial part of the length of the article is detected by using the precisely determined reference length and a length of a remaining portion of the article is measured by processing the output pulses of the rotary encoder. Therefore, the whole length of the article viewed in the traveling direction can be measured by the relatively simple construction in an accurate manner. Moreover, when the length measured by the output pulses from the rotary encoder is corrected with reference to the precisely determined reference length, the reliability and precision of the measurement can be further improved.

What is claimed is:

1. An apparatus for measuring a length of articles transported by a conveyor including a plurality of rollers in a given direction comprising:

an article detecting means including first and second sets of light sensors arranged along said conveyor such that a distance between successive light sensors is set to a predetermined reference distance for generating article detection signals;

a rotation angle detecting means for detecting a rotation angle of a roller of said conveyor to generate a rotation signal, said rotation angle detecting means comprises a rotary encoder means for generating output pulses; and a length measuring means for measuring a length of an article by processing said article detection signals and rotation signal, said length measuring means comprising a pulse generating circuit for generating a count start signal when a front edge of an article is detected by the second light sensor, and a count stop signal when a rear edge of the article is detected by the first light sensor, a counter for counting said output pulses from said rotary encoder means during a time interval between said count start signal and said count stop signal to derive a count value, and a calculation circuit for calculating the length of the article in accordance with an equation $L=L0+a$, wherein L0 is said reference length and a is a length corresponding to said count value.

2. An apparatus according to claim 1, wherein said reference distance is set to be substantially equal to an average length of the articles.

3. An apparatus according to claim 2, wherein said reference distance is set to equal to or slightly shorter than a minimum length of the articles.

4. An apparatus for measuring a length of an articles transported by a conveyor including a plurality of rollers in a given direction comprising:

an article detecting means including first and second sets of light sensors arranged along said conveyor such that a distance between successive light sensors is set to a predetermined reference distance for generating article detection signals, and said first and second sets of light sensors are separated from each other by a similar distance to an average length of the articles;

a rotation angle detecting means for detecting a rotation angle of a roller of said conveyor to generate a rotation signal, said rotation angle detecting means comprising a rotary encoder means for generating output pulses; and a length measuring means for measuring a length of an article by processing said article detection signals and rotation signal, said length measuring means comprising a pulse generating circuit for generating a count start signal when a front edge of an article is detected by said first light sensor, a first count stop signal when a rear edge of the article is detected by said first light sensor and a second count stop signal when a front edge of the article is detected by said second light sensor, a first counter for counting said output pulses from said rotary encoder means during a time interval between said count start signal and said first count stop signal to derive a first count value x, a second counter for counting said output pulses from said rotary encoder means during a time interval between said count start signal and said second count stop signal to derive a second count value y, and a calculation circuit for calculating the length of the article in accordance with an equation $L=L0+(x-y)$, wherein L0 is said reference length.

5. An apparatus according to claim 4, wherein said reference distance is set to be substantially equal to an average length of the articles.

6. An apparatus according to claim 5, wherein said reference distance is set equal to or slightly shorter than a minimum length of the articles.

7. An apparatus for measuring a length of an article transported by a conveyor including a plurality of rollers in a given direction comprising:

an article detecting means including at least three sets of light sensors arranged along said conveyor such that distances between successive light sensors are set to form at least three reference lengths for generating article detection signals;

a rotation angle detecting means for detecting a rotation angle of a roller of said conveyor to generate a rotation signal, said rotation angle detecting means comprising a rotary encoder means for generating output pulses as said rotating signal; and a length measuring means for measuring a length of an article by processing said article detection signals and rotation signal, said length measuring means comprising a pulse generating circuit for generating operation pulses in response to output signals of said at least three sets of light sensors, a counting circuit for counting said output pulses generated from said rotary encoder means under the control of said operation pulses, and a signal processing circuit for calculating at least three measured lengths of the article in accordance with said operation pulses, count values generated by said counting circuit and said at least reference lengths.

8. An apparatus according to claim 7, wherein said at least three sets of light sensors are arranged such that said at least three reference lengths are different from each other.

9. An apparatus according to claim 7, wherein said signal processing circuit comprises a count readout circuit for reading out count values in said counting circuit in response to said operation pulses and a calculating circuit for calculating said at least three measured lengths of the article and selecting one of these measured lengths which is closest to any one of said at least three reference lengths as a final measured length of the article.

* * * * *